United States Patent
Petrenga

(10) Patent No.: US 10,035,403 B2
(45) Date of Patent: Jul. 31, 2018

(54) AUTOMOTIVE AIR-CONDITIONING SYSTEM WITH DIFFERENT USER-SELECTABLE OPERATING PROFILES

(71) Applicant: FCA Italy S.p.A., Turin (IT)

(72) Inventor: Pietro Petrenga, Turin (IT)

(73) Assignee: Studio Torta, Turin (IT)

( * ) Notice: Subject to any disclaimer, the term of this patent is extended or adjusted under 35 U.S.C. 154(b) by 124 days.

(21) Appl. No.: 15/017,171

(22) Filed: Feb. 5, 2016

(65) Prior Publication Data
US 2016/0229263 A1    Aug. 11, 2016

(30) Foreign Application Priority Data
Feb. 6, 2015   (IT) ............................... TO2015A0085

(51) Int. Cl.
*B60H 1/00* (2006.01)
*B60R 16/037* (2006.01)

(52) U.S. Cl.
CPC ..... *B60H 1/00642* (2013.01); *B60H 1/00742* (2013.01); *B60H 1/00978* (2013.01); *B60H 1/00985* (2013.01); *B60R 16/037* (2013.01)

(58) Field of Classification Search
CPC ............ B60H 1/00642; B60H 1/00742; B60H 1/00978; B60H 1/00985; B60R 16/037
See application file for complete search history.

(56) References Cited

U.S. PATENT DOCUMENTS

| | | | |
|---|---|---|---|
| 2004/0129007 A1 | 7/2004 | Tomita | |
| 2011/0088887 A1 | 4/2011 | Schneider | |
| 2013/0204497 A1 | 8/2013 | Depetro | |
| 2015/0197205 A1* | 7/2015 | Xiong ................... | B60R 16/037 |
| | | | 701/49 |

FOREIGN PATENT DOCUMENTS

WO    WO 2014/195134    12/2014

OTHER PUBLICATIONS

Search Report for Italian Application IT TO2015A000085, 7 pages (3 in Italian) (dated Oct. 8, 2015).
EP 16154581.9: Search Report for European application, 7 pages (dated Jul. 12, 2016).
EP 16154581.9: Response to objections drawn up for European application, 14 pages (dated Feb. 9, 2017).

* cited by examiner

*Primary Examiner* — Basil T. Jos
(74) *Attorney, Agent, or Firm* — Greer, Burns & Crain, LTD

(57) ABSTRACT

An automotive air-conditioning system comprising an electronic control unit programmed to store different operating profiles of the air-conditioning system, each of which is defined by a temperature, air flow rate and air distribution in the passenger compartment; and a human-machine interface configured to allow a user to select one of the stored operating profiles; and wherein the electronic control unit is further programmed to automatically control the air-conditioning system operation based on the selected operating profile.

4 Claims, 1 Drawing Sheet

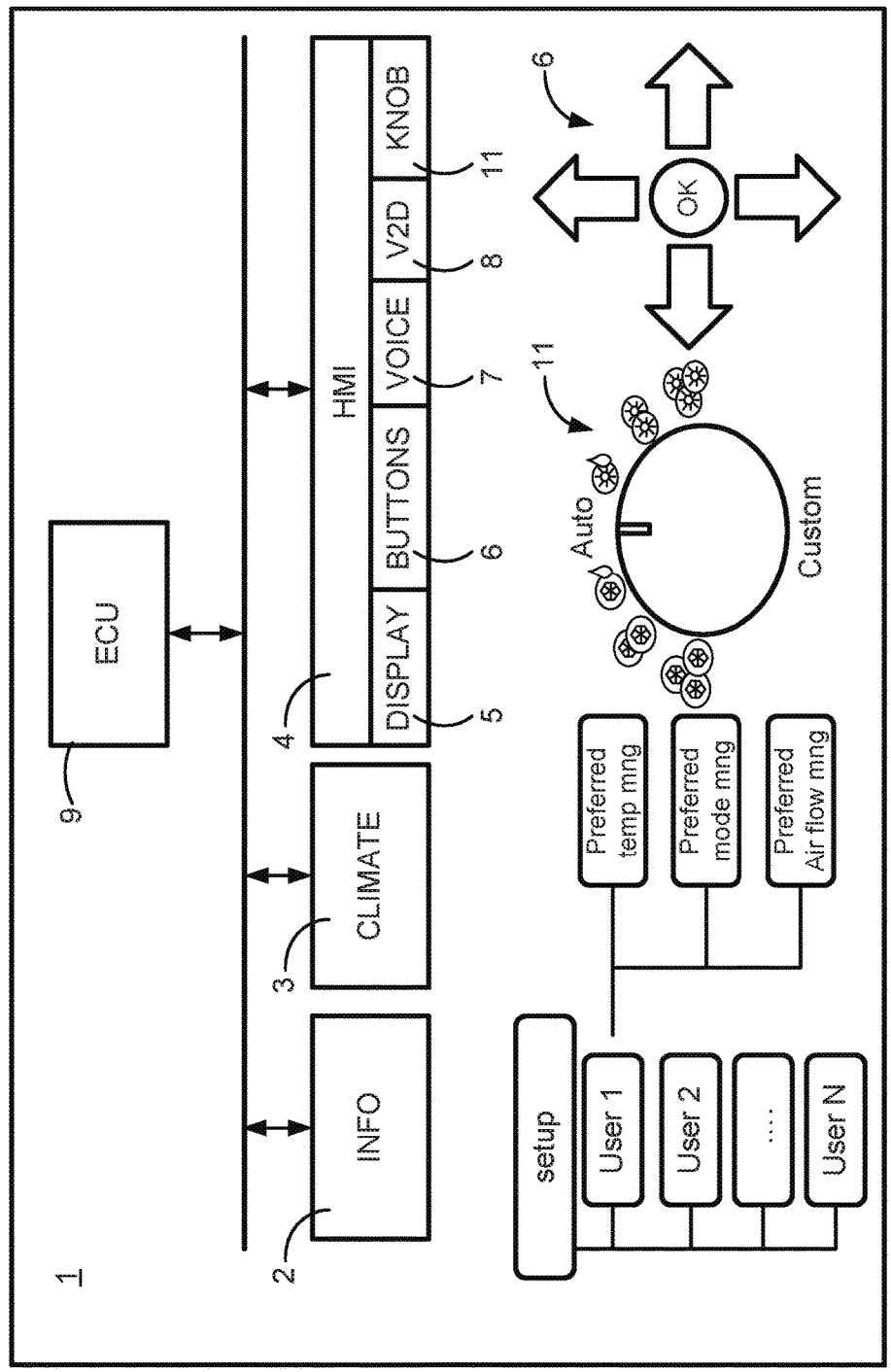

AUTOMOTIVE AIR-CONDITIONING SYSTEM WITH DIFFERENT USER-SELECTABLE OPERATING PROFILES

CROSS REFERENCE TO RELATED APPLICATION

This application claims priority to and the benefit of Italian Application No. TO2015A000085, filed on Feb. 6, 2015, which is incorporated herein by reference in its entirety.

TECHNICAL BACKGROUND OF THE INVENTION

The present invention relates in general to automotive air conditioning systems, and in particular to automotive air conditioning systems having different user-selectable operating profiles.

STATE OF THE ART

As is known, in the automotive field the design of the operations which can be performed on board the motor vehicle is increasingly aimed at solutions providing a high level of interactivity between the driver, passengers, vehicle and the outside world.

In particular, the driver and the passengers have increasingly greater control over the operations of the motor vehicle such as for example, control of the air conditioning system, the hi-fi system, etc., and the interaction of the motor vehicle with the outside world, such as for example the management of telephone calls on the mobile phone and their interruption of music, management of the information from the trip computer, interaction with the on-board satellite navigation system, etc.

To such purpose, modern motor vehicles are equipped with human-machine interfaces (HMIs) by means of which a user, whether the driver or a passenger, can interact with the on-board systems, such as, for example, insert a destination in the navigation system, an address or a phone number in an address book of an onboard "hands free" system for the management of telephone calls from mobile phones, etc.

One particularly popular example of a human-machine interface is the infotainment system developed by the Applicant and called Blue&Me™, which provides USB, NFC and Bluetooth connectivity, and a hands free phone kit that can be completely controlled via voice commands, so as to allow the driver and passengers to use personal electronic devices such as mobile phones, PDAs, music players or external hard discs, without having to resort to the commands of those devices, so as to make their use while driving easier and less dangerous.

OBJECT AND ABSTRACT OF THE INVENTION

The purpose of the present invention is to provide a simple, economic and user-friendly human-machine interface for an automotive air conditioning system.

According to the present invention, an automotive air conditioning system is provided, as defined in the appended claims.

BRIEF DESCRIPTION OF THE DRAWINGS

The attached FIGURE schematically illustrates an automotive air conditioning system according to the present invention.

DETAILED DESCRIPTION OF PREFERRED EMBODIMENTS OF THE INVENTION

The present invention will now be described in detail with reference to the attached figure to enable a person skilled in the art to implement and use it. Various modifications to the embodiments described will be immediately apparent to the persons skilled in the art and the general principles described herein may be applied to other embodiments and applications while remaining within the scope of protection of the present invention, as defined in the appended claims. As a result, the present invention should not be considered to be limited to the embodiments described and illustrated, but should be given the widest scope of protection in compliance with the principles and features herein described and claimed.

With reference to the appended figure, reference numeral 1 globally denotes a motor vehicle, which is provided with various on-board systems, of which only those involved in the present invention will be described, and comprising, among others, an infotainment system 2, an air conditioning system 3, and human-machine interface (HMI) 4 by means of which the occupants can interact with the infotainment system 2 and the air conditioning system 3.

In order to allow the occupants of the motor vehicle 1 to interact with the infotainment system 2 and with their personal mobile electronic devices, the human-machine interface 4 comprises, among other things:
 a display 5,
 selection and activation buttons 6, typically arranged on a steering wheel (not shown) of the motor vehicle 1,
 a voice recognition system 7 (optional), and
 a bidirectional short-range wireless communication system 8, hereinafter abbreviated for convenience in V2D (Vehicle-to-Device) communication system, operable to detect and identify in its communication range bidirectional short-range wireless communication systems of mobile personal electronic devices on board the motor vehicle 1, hereinafter abbreviated for convenience in D2V (Device-to-Vehicle) communication systems, and to establish a communication with the D2V communication systems detected and identified, possibly as a result of a suitable pairing procedure.

The on-board systems described above are connected to, and controlled by, an electronic control unit 9 via an automotive on-board communication network 10, such as CAN, FlexRAy or others, by means of which the electronic control unit 9 receives data indicative of quantities comprising, inter alia, internal air temperature, external air temperature, air vent air temperature, internal air humidity, and solar radiation, and measured by suitable on-board sensors.

According to the present invention, the electronic control unit 9 is programmed to:
 store different user-selectable air conditioning system operating profiles, each of which is defined by corresponding air temperature, air flow rate and air distribution in the passenger compartment; and
 automatically control the air-conditioning system 3 operation based on the selected operating profile.
 In particular, the stored operating profiles comprise:
 one or more factory operating profiles, and one or more user operating profiles, each associated to a corresponding user.

The factory operating profiles comprise:
an automatic operating profile, and
various non-modifiable operating profiles configured in relative terms with respect to the automatic operating profile.

In response to the selection of the automatic operating profile, the electronic control unit 9 is further programmed to determine comfort air-conditioning conditions in the passenger compartment based on physical quantities comprising one or more among internal air temperature, outside air temperature, air vent air temperature, internal air humidity and solar radiation, and to control the operation of the air-conditioning system 3 accordingly.

The human-machine interface 4 is appropriately designed to allow the user to interact with the air-conditioning system 3, and in particular to:
select one of the stored operating profiles, and
create a new user operating profile and associate it to a corresponding user ID.

In the appended figure the user operating profile database is illustrated by way of example.

To make the selection of the stored operating profiles as 'user-friendly' as possible, conveniently the human-machine interface 4 comprises a selection knob 11 configured to assume different selection positions, to each of which a corresponding stored operating profile is associated.

In particular, a selection position is associated with the automatic operating profile, other selection positions are associated with non-modifiable operating profiles, and another selection position is associated with the user operating profile category.

When the knob 11 is brought to the position associated to the user operating profile category, the selection of one of the user operating profiles is then made via the human-machine interface 4. In this regard, the electronic control unit 9 is programmed to cause the display 6 of the human machine interface 4 to display the user IDs associated with stored user operating profiles, and to allow the user, by means of selection and activation keys 7 arranged on the steering wheel or via the voice recognition system 8 of the human-machine interface 4, to scroll through the user IDs in a certain direction (from top to bottom or vice versa, or from right to left or vice versa), and to select the desired ID.

Alternatively, the selection of a user operating profile may be made automatically through automatic user recognition and automatic selection of the user operating profile associated with the recognised user.

Conveniently, the automatic user recognition can be performed using the V2D communication system which, as mentioned, is able to automatically detect and identify a personal, portable wireless user communication device within its communication range.

In this embodiment, the electronic control unit 9 is programmed to allow a user to associate a recognized personal portable wireless user communication device ID upon creation of a user operating profile and through the human-machine interface 4.

An examination of the characteristics of the present invention clearly shows how it allows a user to control the operation of the air-conditioning system via a particularly simple, user-friendly, and highly cost-effective interface.

The invention claimed is:

1. An automotive air-conditioning system comprising:
an electronic control unit programmed to store different user-selectable operating profiles for the air-conditioning system, each of which is defined by corresponding air temperature, air flow rate and air distribution in the passenger compartment; and
a human-machine interface configured to allow a user to select one of the stored operating profiles;
wherein the electronic control unit is further programmed to automatically control the air-conditioning system operation based on the selected operating profile;
wherein the stored operating profiles comprise:
one or more factory operating profiles, and
one or more user operating profiles, each associated to a corresponding user;
wherein the factory operating profiles comprise:
an automatic operating profile; and
non-modifiable operating profiles;
wherein, in response to the selection of the automatic operating profile, the electronic control unit is further programmed to determine comfort air-conditioning conditions in the passenger compartment based on physical quantities comprising one or more among internal air temperature, outside air temperature, air vent air temperature, internal air humidity and solar radiation, and to control the operation of the air-conditioning system accordingly;
wherein the human-machine interface is further configured to allow a user to select a user operating profile category and, within the category, one of the user operating profiles; and
wherein the human-machine interface comprises:
a selection knob configured to assume different selection positions, wherein a selection position is associated with the user operating profile category, a selection position is associated with the automatic operating profile, and other selection positions are associated with corresponding non-modifiable operating profiles; and
selection and activation buttons and/or a voice recognition system to select a user operating profile within the user operating profile category.

2. An automotive air-conditioning system of claim 1, wherein the human-machine interface is further configured to allow a user to create a user operating profile and associate it to a corresponding user identifier.

3. An automotive air-conditioning system claim 1, wherein the human-machine interface is further configured to automatically recognize a user and automatically select a user operating profile associated to the recognized user.

4. An automotive air-conditioning system of claim 3, wherein the human-machine interface further comprises a short-range wireless communication system configured to automatically detect and identify personal portable wireless communication devices within its communication field; and
wherein the electronic control unit is further programmed to allow a user to associate, a recognized user personal portable wireless communication device identifier upon creation of a user operating profile and through the human-machine interface.

* * * * *

UNITED STATES PATENT AND TRADEMARK OFFICE
CERTIFICATE OF CORRECTION

PATENT NO. : 10,035,403 B2
APPLICATION NO. : 15/017171
DATED : July 31, 2018
INVENTOR(S) : Pietro Petrenga Page 1 of 1

It is certified that error appears in the above-identified patent and that said Letters Patent is hereby corrected as shown below:

On the Title Page

At item (73) (Assignee):
Please delete "Studio Torta" and insert -- FCA Italy S.p.A. -- therefor.

Signed and Sealed this
Eleventh Day of June, 2019

Andrei Iancu
*Director of the United States Patent and Trademark Office*